United States Patent
Sakaguchi (10) Patent No.: US 6,301,070 B1
(45) Date of Patent: Oct. 9, 2001

(54) DISK DEVICE HAVING A RECORDING MEDIUM ROTATABLE IN A CONTROLLED STEPWISE MANNER IN RESPONSE TO A REFERENCE CLOCK SIGNAL OF VARIABLE FREQUENCY

(75) Inventor: Takahiro Sakaguchi, Kokubunji (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/195,822

(22) Filed: Nov. 19, 1998

(30) Foreign Application Priority Data

Nov. 20, 1997 (JP) .................................................. 9-319657

(51) Int. Cl.[7] .................................................. G11B 15/46
(52) U.S. Cl. ......................... 360/73.03; 360/69; 318/268
(58) Field of Search .................................. 360/69, 73.03, 360/71, 98.01, 98.04; 318/268, 696

(56) References Cited

U.S. PATENT DOCUMENTS 4,754,344 * 6/1988 Shoji et al. ............................ 360/48
5,434,722 * 7/1995 Bizjak et al. ......................... 360/69
5,998,947 * 12/1999 Shimizu et al. ................. 369/239 X

* cited by examiner

Primary Examiner—Andrew L. Sniezek
(74) Attorney, Agent, or Firm—Anderson, Kill & Olick, P.C.

(57) ABSTRACT

A motor rotates a recording medium of a disk cartridge loaded in a disk device. A disk-type detecting unit detects whether the recording medium of the disk cartridge loaded in the disk device is a high-capacity recording medium or a low-capacity recording medium. A motor driving controlling unit causes the motor to rotate in accordance with a given reference clock signal, the motor driving controlling unit being set to a first mode for rotating the motor at a first rotation speed when the disk-type detecting unit detects that the recording medium of the loaded disk cartridge is the low-capacity recording medium and being set to a second mode for rotating the motor at a second rotation speed when the disk-type detecting unit detects that the recording medium of the loaded disk cartridge is the high-capacity recording medium, the second rotation speed being higher than the first rotation speed. A reference-clock-signal controlling unit, when the disk-type detecting unit detects that the recording medium of the loaded disk cartridge is the high-capacity recording medium, gradually increases a frequency of the reference clock signal to be provided to the motor driving controlling unit so that the rotation speed of the motor gradually increases, and, then, finally reaches the second rotation speed.

5 Claims, 6 Drawing Sheets

CHUCKING HOLE

DISK DEVICE HAVING A RECORDING MEDIUM ROTATABLE IN A CONTROLLED STEPWISE MANNER IN RESPONSE TO A REFERENCE CLOCK SIGNAL OF VARIABLE FREQUENCY

BACKGROUND OF THE INVENTION

1. Field of the Invention

The present invention relates to a disk device, and, in particular, to a disk device which performs information recording and reproducing on any of a plurality of types of disks on which recording and reproducing are performed at different disk rotation speeds.

2. Description of the Related Art

In a conventional 3.5-inch FDD (Floppy Disk Drive), generally, the rotation speed of a disk is set to either 300 rpm or 360 rpm in accordance with the type of the disk. In a high-capacity FDD, because a negative-pressure-type magnetic head is used as a recording and reproducing head, it is necessary to rotate a disk at high speed (3600 rpm).

Therefore, when the high-capacity FDD has an arrangement such that the high-capacity FDD can perform recording and reproducing on a type of a disk on which recording and reproducing is performed by the conventional 3.5-inch FDD, it is necessary to contrive a disk-motor control method for this purpose.

The negative-pressure-type magnetic head will now be simply described.

The negative-pressure-type magnetic head used for performing recording and reproducing on a high-capacity floppy disk is disposed so that the disk (magnetic sheet) does not come into contact with the magnetic head when the disk cartridge is loaded in the disk device. Then, as a result of the disk being rotated at high speed, a negative pressure occurs between the magnetic-head surface and the disk surface, by which the magnetic sheet is attracted to the magnetic head, and recording and reproducing is performed on the disk by the magnetic head. That is, the negative-pressure-type magnetic head has a property reverse to a property of a floating-type magnetic head used in an HDD (Hard Disk Drive).

When a high-capacity floppy-disk cartridge is loaded in the disk device, as a result of the disk rotating at high speed, that is, 3600 rpm, the spindle motor is controlled so that the spindle motor stops rotating when the high-capacity floppy-disk cartridge is ejected from the disk device. However, due to the inertia of the spindle motor, when the high-capacity floppy-disk cartridge is ejected, a maximum time of approximately 2 sec. is required for the spindle motor to completely stop.

The shape of a high-capacity floppy-disk cartridge has an arrangement approximately the same as that of the low-capacity floppy-disk cartridge.

Figure 1:
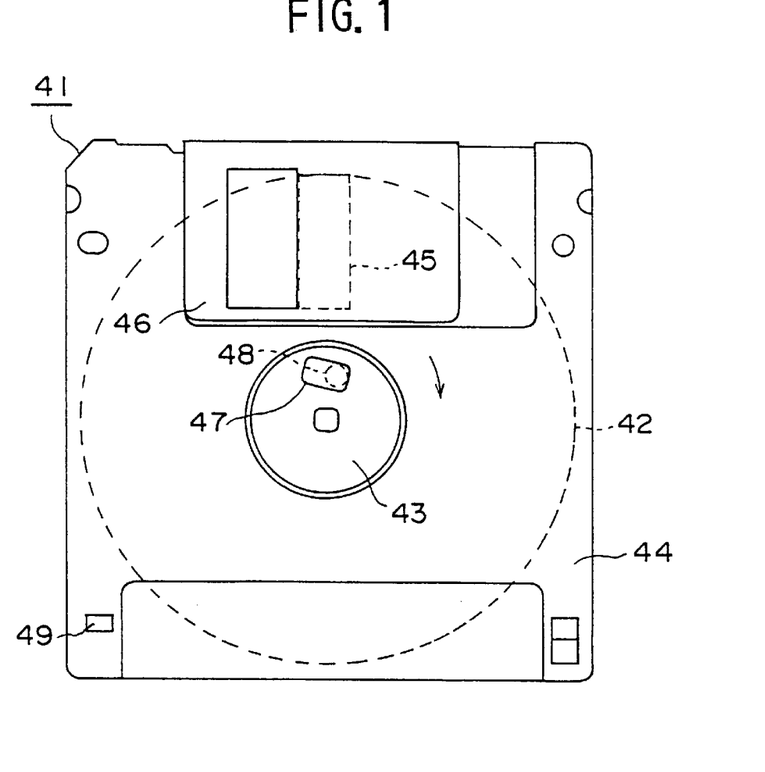
FIG. 1 shows a reverse-side view of a floppy-disk cartridge.
Figure 2:
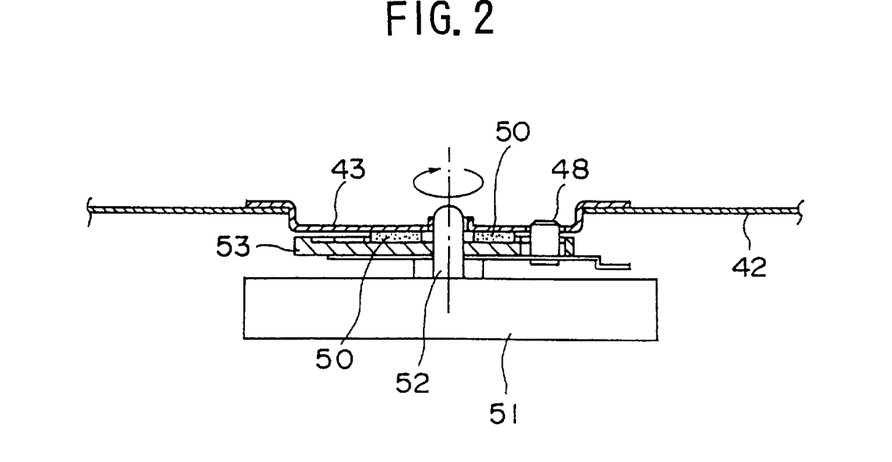
FIG. 2 sectional view indicating a condition in which a floppy disk is loaded onto a spindle motor.

FIG. 1 shows a plan view of a floppy-disk cartridge, and FIG. 2 shows a sectional view in which a floppy disk is loaded on a spindle motor of a disk device.

In the floppy-disk cartridge 41, a hub 43 is fixed at the center of a disk-shaped recording medium 42. The recording medium 42 is covered by a resin shell 44. An opening 45 is formed in the shell 44. The opening 45 is usually covered by a shutter 46. The shutter 46 is opened so as to cause the opening 45 to be uncovered when the disk cartridge 41 is loaded in a predetermined position of a disk device. When the shutter 46 is open, a portion of the recording medium 42 is exposed from the shell 44 through the opening 45.

The hub 43 is exposed from the shell 44, and engages with a chucking stand 53 fixed to a rotation shaft 52 of a spindle motor 51. The hub 43 is made of metal, and is fastened onto the chucking stand 53 as a result of a magnet 50 fixed to the chucking stand 53 attracting the hub 43.

A positioning hole 47 is formed in the hub 43 of the recording medium 42. A driving pin 48 planted on the spindle motor 51 engages with the positioning hole 47.

A distinguishing hole 49 for distinguishing the type of the floppy disk is formed in the shell 44. When the floppy-disk cartridge 41 is loaded in the disk device, the position of the distinguishing hole 49 is detected by a plurality of microswitches, and, thereby, it is determined whether the loaded floppy disk is the high-capacity floppy disk or the low-capacity floppy disk.

Figure 3A:
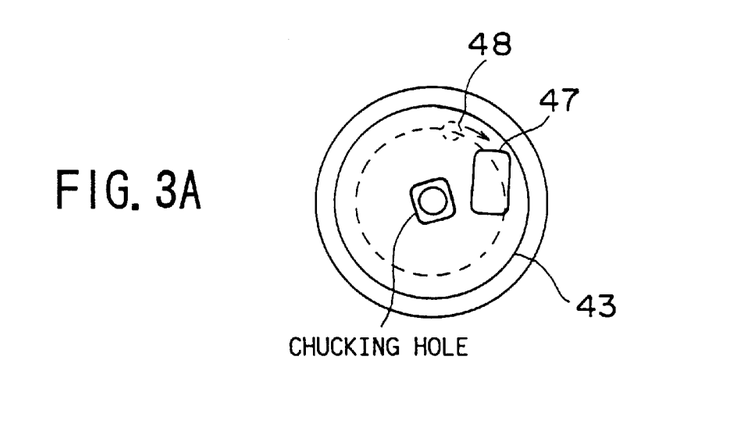
FIGS. 3A, 3B and 3C show a process in which a driving pin of the spindle motor engages with a positioning hole of a hub of the floppy disk.
Figure 3B:
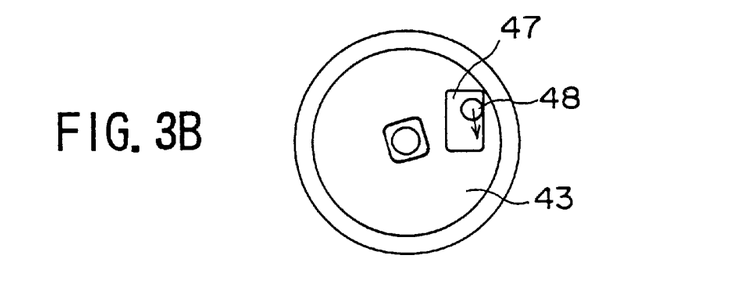
Figure 3C:
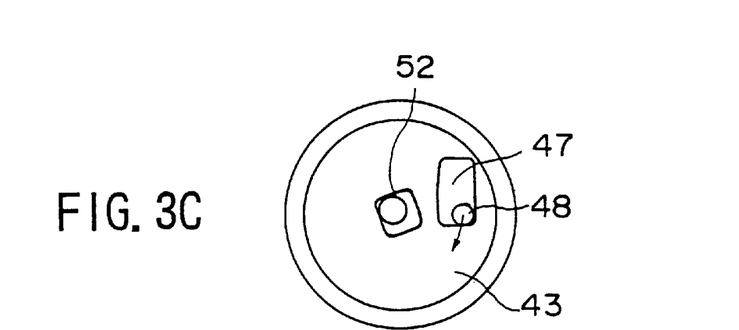

FIGS. 3A, 3B and 3C show a process in which the positioning hole 47 of the floppy disk (recording medium 42) is engaged by the driving pin 48 of the spindle motor 51. FIG. 3A shows a condition immediately after the floppy disk (recording medium 42) is loaded on the chucking stand 53, FIG. 3B shows a condition in which the spindle motor 51 is rotated and the driving pin 48 is inserted into the positioning hole 47, and FIG. 3C shows a condition after the driving pin 48 engages with the positioning hole 47.

When the floppy-disk cartridge 41 is loaded in the predetermined position of the disk device, the driving pin 48 is not always inserted in the positioning hole 47, as shown in FIG. 3A. Then, the spindle motor 51 is slowly rotated, and, thereby, the driving pin 48 is caused to be inserted into the positioning hole 47, as shown in FIG. 3B.

As a result of further rotation of the spindle motor 51, the driving pin 48 comes into contact with the rotation-direction end of the positioning hole 47, as shown in FIG. 3C, and the rotation-driving force of the spindle motor 51 is positively transmitted to the hub 43.

In the disk device in the related art, when an ejecting button is pressed unsatisfactorily, and, then, the ejecting button is returned, the disk is once removed from the chucking stand of the spindle motor, and, then, the disk is again chucked onto the chucking stand.

When the low-capacity floppy-disk cartridge is loaded in the disk device, the spindle motor rotates at a relatively low speed. However, when the high-capacity floppy-disk cartridge is loaded in the disk device, the spindle motor rotates at a speed equal to or more than ten times the speed of the low-capacity floppy-disk cartridge. Therefore, the high-capacity floppy disk may be seriously damaged as a result of the above-mentioned situation, in which the disk is once removed from the chucking stand, and, then, the disk is again chucked onto the chucking stand, occurring while the spindle motor is rotating at the high speed.

Further, when the spindle motor starts running, the rotation speed of the spindle motor is sharply increased in the related art. Thereby, the spindle motor races without engagement of the driving pin of the chucking stand with the positioning hole of the hub of the floppy disk, and, thereby, the driving pin and/or the hub may be damaged.

SUMMARY OF THE INVENTION

The present invention is directed to eliminating the above-mentioned problems, and an object of the present invention is to provide a disk device in which a spindle motor and a floppy disk are appropriately engaged with one another without damage to either a driving pin of a chucking stand of the spindle motor or a positioning hole of a hub of the floppy disk.

A disk device, according to the present invention, which performs information recording and reproducing on a recording medium of a disk cartridge loaded therein, comprises:

a motor rotating the recording medium of the disk cartridge loaded in the disk device;

a disk-type detecting unit detecting whether the recording medium of the disk cartridge loaded in the disk device is a high-capacity recording medium or a low-capacity recording medium;

a motor driving controlling unit causing the motor to rotate in accordance with a given reference clock signal, the motor driving controlling unit being set to a first mode for rotating the motor at a first rotation speed, at which information recording and reproducing is performed on the low-capacity recording medium, when the disk-type detecting unit detects that the recording medium of the loaded disk cartridge is the low-capacity recording medium and being set to a second mode for rotating the motor at a second rotation speed, at which information recording and reproducing is performed on the high-capacity recording medium, when the disk-type detecting unit detects that the recording medium of the loaded disk cartridge is the high-capacity recording medium, the second rotation speed being higher than the first rotation speed; and a reference-clock-signal controlling unit, when said disk-type detecting unit detects that the recording medium of the loaded disk cartridge is the high-capacity recording medium, gradually increasing a frequency of the reference clock signal to be provided to the motor driving controlling unit so that the rotation speed of the motor gradually increases, and, then, finally reaches the second rotation speed.

In this arrangement, when said disk-type detecting unit detects that the recording medium of the loaded disk cartridge is the high-capacity recording medium, the reference-clock-signal controlling unit gradually increases a frequency of the reference clock signal to be provided to the motor driving controlling unit so that the rotation speed of the motor gradually increases, and, then, finally reaches the second rotation speed. Thereby, it is prevented that the motor suddenly rotates at the second rotation speed. As a result, engagement of the motor with the recording medium can be performed when the motor rotates at a lower rotation speed. Therefore, portions of the motor and recording medium at which said motor engages with said recording medium can be prevented from being damaged.

The reference-clock-signal controlling unit may count index pulses obtained in response to rotation of the motor so as to obtain a resulting count value, and may increase the frequency of the reference clock signal to be provided to the motor driving controlling unit in accordance with the obtained count value. In this arrangement, it is possible to obtain a timing for changing the frequency of the reference clock signal using the existing index pulses.

The reference-clock-signal controlling unit, when the disk-type detecting unit detects that the recording medium of the loaded disk cartridge is the low-capacity recording medium, may provide the reference clock signal of a frequency to the motor driving controlling unit such that the motor rotates at the first rotation speed. In this arrangement, the motor rotates at the first rotation speed when the disk-type detecting unit detects that the recording medium of the loaded disk cartridge is the low-capacity recording medium. Thereby, information recording and reproducing on the recording medium can be immediately started when the recording medium of the loaded disk cartridge is the low-capacity recording medium.

The disk device may further comprises a cartridge loading detecting unit detecting loading of the disk cartridge in the disk device, wherein, when the cartridge loading detecting unit detects that the disk cartridge is loaded in the disk device, a given motor driving signal indicates that the motor is to run, and the disk-type detecting unit detects that the recording medium of the loaded disk cartridge is the high-capacity recording medium, the reference-clock-signal controlling unit gradually increases the frequency of the reference clock signal to be provided to the motor driving controlling unit so that the rotation speed of the motor gradually increases, and, then, finally reaches the second rotation speed.

The reference-clock-signal controlling unit, when the disk-type detecting unit detects that the recording medium of the loaded disk cartridge is the high-capacity recording medium, may cause starting of the increase of the frequency of the reference clock signal to be delayed a predetermined time from the time when the cartridge loading detecting unit detects that the disk cartridge is loaded in the disk device and the given motor driving signal indicates that the motor is to run.

In this arrangement, the reference-clock-signal controlling unit starts increasing the frequency of the reference clock signal after the predetermined time elapses after the cartridge loading detecting unit detects that the disk cartridge is loaded in the disk device and the given motor driving signal indicates that the motor is to run. Thus, the reference-clock-signal controlling unit starts increasing the frequency of the reference clock signal after the disk cartridge has been positively loaded in the disk device. Thereby, engagement of the motor with the recording medium can be performed positively when the motor rotates at a lower rotation speed. As a result, portions of the motor and recording medium at which said motor engages with said recording medium can be prevented from being damaged.

Other objects and further features of the present invention will become more apparent from the following detailed description when read in conjunction with the accompanying drawings.

DETAILED DESCRIPTION OF PREFERRED EMBODIMENTS

Figure 4:
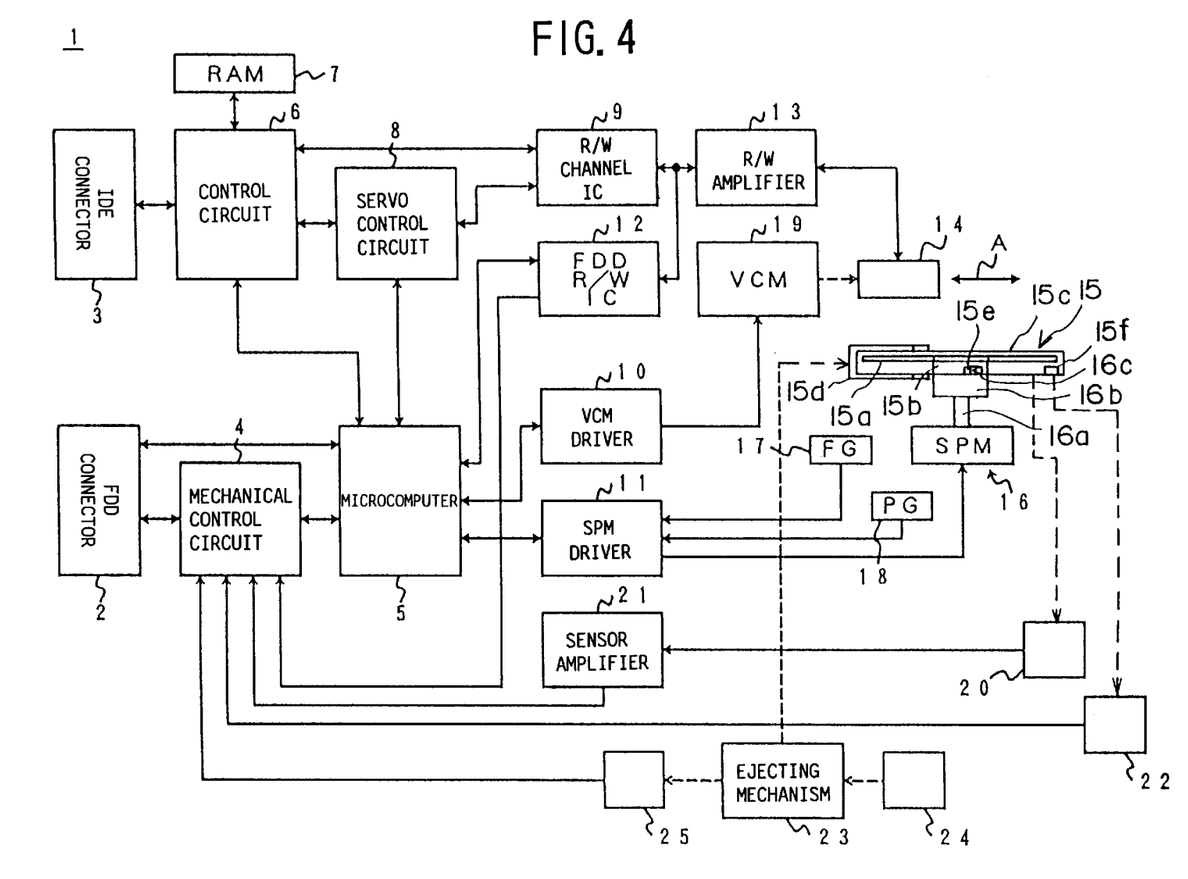
FIG. 4 shows a block diagram of one embodiment of the present invention.

FIG. 4 shows a block diagram of one embodiment of the present invention.

A disk device 1 in the embodiment is a floppy disk device, and can perform information recording and reproducing on the conventional low-capacity floppy disk of 720 kilobytes (DD), 1.44 megabytes (HD) or the like, and, also, can perform information recording and reproducing on the high-capacity floppy disk of 120 megabytes such as UHD or the like.

The disk device 1 has a first connector 2 which is used when information recording or reproducing is performed on the conventional low-capacity floppy disk, and a second connector 3 which is used when information recording or reproducing is performed on the high-capacity floppy disk such as UHD or the like.

The first connector 2 is connected with a mechanical control circuit 4 and a microcomputer 5. The second connector 3 is connected with a control circuit 6.

The mechanical control circuit 4 generates a control signal in accordance with commands provided through the first connector 2 and various detection signals provided by sensors which detect mechanical conditions, and provides the control signal to the microcomputer 5. The microcomputer 5 controls the entirety of operations of the disk device 1, and, when information recording or reproducing is performed on the low-capacity floppy disk, the microcomputer 5 provides the interface through the first connector 2.

The control circuit 6 provides the interface through the second connector 3. The control circuit 6 is connected with the microcomputer 5, and, also, is connected with a RAM 7, a servo control circuit 8 and a read/write channel IC 9. The control circuit 6 performs signal reading/writing and servo control when information recording or reproducing is performed on the high-capacity floppy disk.

The microcomputer 5 generates driving control signals in accordance with control signals provided by the mechanical control circuit 4, the control circuit 6 and the servo control circuit 8, and provides the driving control signals to a VCM (Voice Coil Motor) driver 10 and a spindle-motor driver 11. Further, the microcomputer 5 is connected with a FDD read/write IC 12 which performs information reading/writing on the low-capacity floppy disk.

The read/write channel IC 9 and the FDD read/write IC 12 are connected with a read/write amplifier 13. The read/write amplifier 13 is connected with a magnetic head 14. The read/write amplifier 13 amplifies a writing signal, and provides the amplified signal to the magnetic head 14. Also, the read/write amplifier 13 amplifies an electric current which is induced in the magnetic head 14 by information magnetically recorded on the disk, and provides the amplified electric current to the read/write channel IC 9 and the FDD read/write IC 12.

The magnetic head 14 is disposed so as to face a floppy-disk cartridge 15. In the floppy-disk cartridge 15, a disk-shaped recording medium (floppy disk) 15*a* is fixed to a hub 15*b* at the center thereof, and is enclosed by a resin shell 15*c*. The shell 15*c* is provided with a shutter 15*d*. When the shutter 15*d* is open, a portion of the recording medium 15*a* is exposed.

The floppy-disk cartridge 15 has a structure the same as the floppy-disk cartridge 41 shown in FIG. 1, and the recording medium (floppy disk) 15*a* is engaged by a spindle motor 16 in a process the same as the process in which the recording medium 42 is engaged by the spindle motor 51 described with reference to FIGS. 2, 3A, 3B and 3C.

When the floppy-disk cartridge 15 is loaded in a predetermined position of the disk device 1, the hub 15*b* of the recording medium 15*a* is fastened, as a result of being attracted by a magnet, onto a chucking stand 16*b* fixed to a rotation shaft 16*a* of the spindle motor 16. A positioning hole 15*e* is formed in the hub 15*b*, and a driving pin 16*c* planted on the chucking stand 16*b* engages with the positioning hole 15*e*.

The hub 15*b* rotates as a result of the spindle motor rotating, and, thereby, the recording medium 15*a* rotates in a predetermined direction. Further, at this time, the shutter 15*d* is open, the magnetic head 14 approaches the recording medium 15*a*, and information recording and reproducing can be performed on the recording medium 15*a*.

The spindle motor 16 is connected with the spindle-motor driver 11, and runs in accordance with a driving signal provided by the spindle-motor driver 11. A rotation detection signal having a frequency corresponding to the rotation speed of the spindle motor 16 is provided to the spindle-motor driver 11 by an FG (Frequency Generator) 17. Also, a pulse signal is provided so that one pulse (index pulse) is provided for every revolution of the spindle motor 16 to the spindle-motor driver 11 by a PG (Pulse Generator) 18.

The spindle-motor driver 11 controls rotation of the spindle motor 16 in accordance with the rotation detection signal provided by the FG 17 and the pulse signal provided by the PG 18.

The magnetic head 14 can move in radial directions (arrow A directions) of the recoding medium 15*a* as a result of being driven by a VCM (Voice Coil Motor) 19 at an opening of the shell 15*c*, which opening is uncovered when the shutter 15*d* is open. The VCM 19 is connected with the VCM driver 10, and operates in accordance with a driving signal provided by the VCM driver 10.

In the disk device 1, a disk-in sensor 20 which detects the floppy-disk cartridge 15 being loaded in a predetermined position of the disk device 1 is provided. The disk-in sensor 20 is connected with the mechanical control circuit 4 via a sensor amplifier 21. The mechanical control circuit 4 detects, through the disk-in sensor 20, the floppy-disk cartridge 15 being loaded in the predetermined position of the disk device 1, and informs the microcomputer 5 of this condition.

A hole (or holes) 15*f* for detecting whether the currently loaded recording medium 15*a* is the low-capacity floppy disk or the high-capacity floppy disk is (are) formed in the floppy-disk cartridge 15. The position (or arrangement) of the hole (or holes) 15*f* is detected by microswitches 22. The microswitches 22 turn on or turn off in accordance with the position (or positions) of the hole (or holes) 15*f*. The arrangement of the hole 15*f* of the low-capacity floppy-disk cartridge (HD) is different from the arrangement of the holes 15*f* of the high-capacity floppy-disk cartridge. Therefore, it is possible to determine, in accordance with the turning on and turning off of the microswitches 22, whether the currently loaded recording medium 15*a* is the low-capacity floppy disk or the high-capacity floppy disk. These microswitches 22 are connected to the mechanical control circuit 4. (The low-capacity floppy-disk cartridge DD has no hole 15*f*, and, therefore, it is determined that the currently loaded recording medium 15*a* is the low-capacity floppy-disk cartridge DD as a result of absence of the hole 15*f* being detected by the microswitches 22).

An ejecting mechanism 23 ejects the floppy-disk cartridge 15, and is provided with an unsatisfactory pressing detecting unit 25 which detects an unsatisfactory pressing condition in which an ejecting button 24 for operating the ejecting mechanism 23 is pressed unsatisfactorily. The unsatisfactory pressing detecting unit 25 detects the movement of the ejecting button 24 before the cartridge ejecting operation is performed by the ejecting mechanism 23, and provides the detection result to the mechanical control circuit 4.

With regard to the detection of unsatisfactory pressing of the ejecting button 24 by the unsatisfactory pressing detecting unit 25, for example, there is a method in which the ejecting button 24 is loosely connected with a slider of the ejecting mechanism 23 and a movement of the ejecting button 24 is detected before the slider actually starts moving, a method in which the slider is loosely provided in the ejecting mechanism 23 and a movement of the slider is detected, and so forth.

Figure 5:
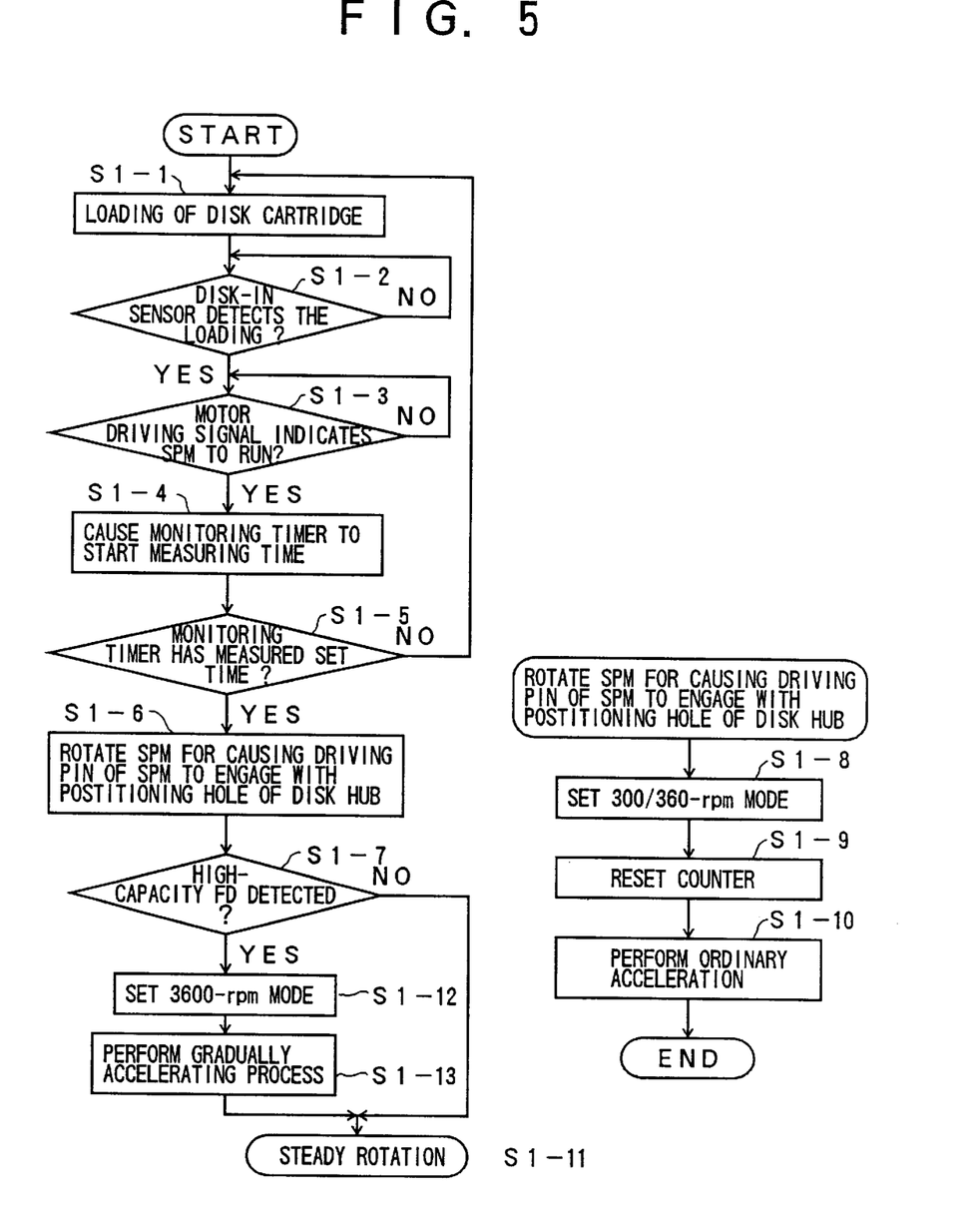
FIG. 5 shows a flowchart of operations of a microcomputer shown in FIG. 4.

FIG. 5 shows a flowchart of operations performed when the floppy-disk cartridge 15 is loaded in the disk device 1.

When the floppy-disk cartridge 15 is loaded in the disk device 1 (in a step S1-1), the loading of the floppy-disk cartridge 15 is detected by the disk-in sensor 20 (in a step S1-2). When the loading of the floppy-disk cartridge 15 is detected in the step S1-2, the microcomputer 5 determines in a step S1-3 whether a motor driving signal, provided by the mechanical control circuit 4 or the control circuit 6, indicates that the spindle motor 16 is to run or is not to run.

When it is determined in the step S1-3 that the motor driving signal indicates that the spindle motor 16 is to run, the microcomputer 5 causes a built-in monitoring timer to start measuring time in a step S1-4. After causing the monitoring timer to start measuring time, the microcomputer 5 always monitors the monitoring timer so as detect the time measured by the monitoring timer reaching a predetermined set time (in a step S1-5).

When it is determined in the step S1-5 that the time measured by the monitoring timer has reached the predetermined set time, the microcomputer 5 provides a reference clock signal of a reference frequency to the spindle-motor driver 11 for rotating the spindle motor 16 so as to cause the driving pin 16c provided on the chucking stand 16b of the spindle motor 16 to engage with the positioning hole 15e formed in the hub 15b of the recording medium 15a (in a step S1-6).

Thus, when the condition, in which the loading of the floppy-disk cartridge 15 is detected through the disk-in sensor 20 and also it is determined that the motor driving signal indicates that the spindle motor 16 is to run, continues for the predetermined set time of the monitoring timer, the microcomputer 5 starts providing the reference clock signal of the reference frequency to the spindle-motor driver 11 for rotating the spindle motor 16.

The step S1-6 includes the following steps S1-8, S1-9 and S1-10. The microcomputer 5 sets the operation mode of the spindle-motor driver 11 to 300/360-rpm mode of the rotation speed for the low-capacity floppy disk (in a step S1-8). When the microcomputer 5 sets the operation mode of the spindle-motor driver 11 to the 300/360-rpm mode of the rotation speed for the low-capacity floppy disk in a step S1-8, the count value of a counter, which counts the index pulses of the pulse signal provided by the PG 18 via the spindle motor driver 11, as described later, is reset to an initial value (in a step S1-9), and the reference clock signal of the reference frequency is provided to the spindle-motor driver 11 by the microcomputer 5, thereby the spindle motor 16 being accelerated (in a step S1-10). The microcomputer 5 provides the reference clock signal of the reference frequency when the initial value is set in the counter.

When the spindle motor driver 11 is set to the 300/360-rpm mode and the reference clock signal of the reference frequency is provided by the microcomputer 5, the spindle-motor driver 11 causes the spindle motor 16 to rotate at a predetermined rotation speed (300 or 360 rpm) for the low-capacity floppy disk.

Then, the microcomputer 5 determines whether the currently loaded recording medium 15a is the low-capacity floppy disk or the high-capacity floppy disk, in accordance with the condition of the microswitches 22 (in a step S1-7).

When it is determined that the currently loaded recording medium 15a is the low-capacity floppy disk (NO in the step S1-7), the spindle-motor driver 11 causes the spindle motor 16 to continue to rotate at 300 or 360 rpm for the low-capacity floppy disk (in a step S1-11).

When it is determined in accordance with the condition of the microswitches 22 that the currently loaded recording medium 15a is the high-capacity floppy disk (YES in the step S1-7), the microcomputer 5 sets the operation mode of the spindle-motor driver 11 to a 3600-rpm mode for the high-capacity floppy disk (in a step S1-12).

When the microcomputer 5 sets the operation mode of the spindle-motor driver 11 to the 3600-rpm mode for the high-capacity floppy disk in the step S1-12, then, the microcomputer 5 performs a below-described gradually accelerating process (in a step S1-13), and gradually increases the frequency of the reference clock signal to be provided to the spindle-motor driver 11 until the frequency of the reference clock signal reaches the reference frequency.

When the 3600-rpm mode is set in the spindle-motor driver 11 and the reference clock signal of the reference frequency is provided by the microcomputer 5, the spindle-motor driver 11 causes the spindle motor 16 to rotate at a predetermined rotation speed (3600 rpm) (in the step S1-11).

Figure 6:
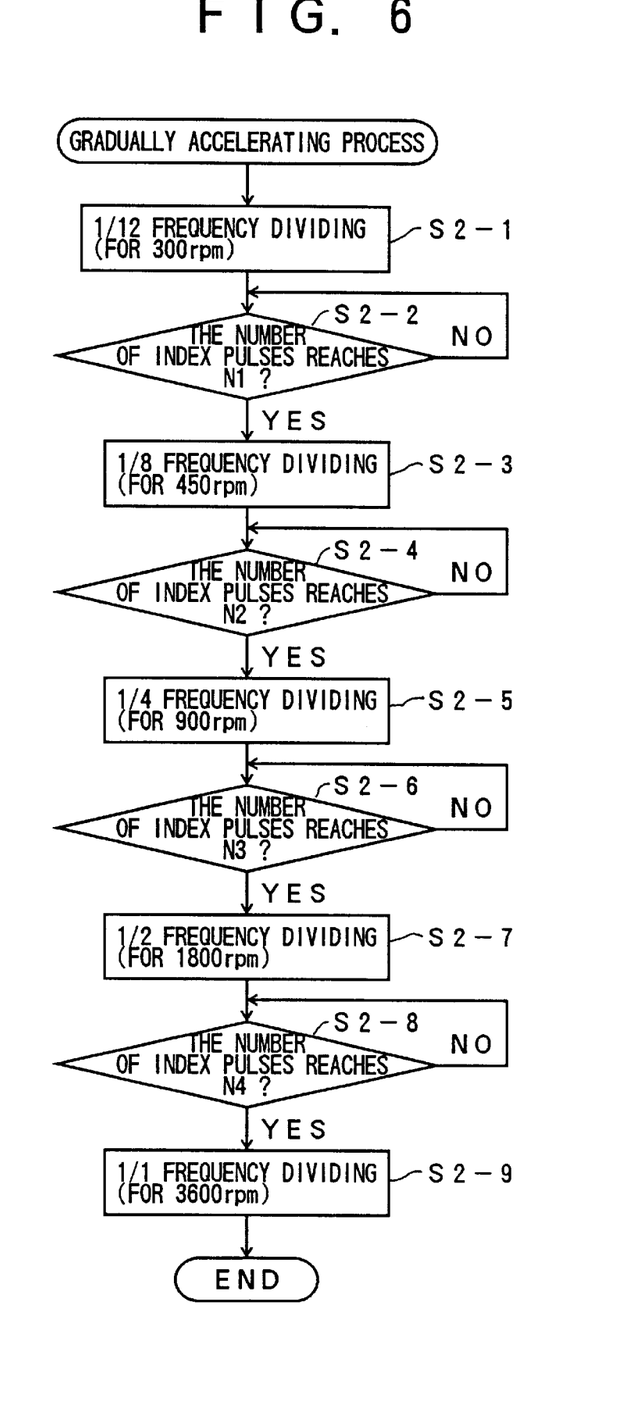
FIG. 6 shows a flowchart of a gradually accelerating process shown in FIG. 5.

The gradually accelerating process in the step S1-13 shown in FIG. 5 will now be described, with reference to FIG. 6.

First, 1/12 frequency dividing is performed on the reference clock signal of the reference frequency (for 3600 rpm in the condition in which the 3600-rpm mode is set in the spindle-motor driver 11), thus, the reference clock signal of the 1/12 frequency, for 300 rpm in the above-mentioned condition of the 3600-rpm mode, is obtained, and the thus-obtained reference clock signal of the 1/12 frequency is provided to the spindle-motor driver 11 (in a step S2-1). In accordance with the thus-provided reference clock signal of the 1/12 frequency, when the 3600-rpm mode is set in the spindle-motor driver 11, the spindle-motor driver 11 causes the spindle motor 16 to rotate at 300 rpm.

In the gradually accelerating process, the count value of the counter which counts the index pulses provided by PG 18 is always monitored. This counter down-counts the index pulses, that is, the count value of the counter is decremented by one, from a predetermined set value, each time when the index pulse is input to the counter. Then, when the count value of the counter reaches 'N1' (in a step S2-2), 1/8 frequency dividing is performed on the second clock signal of the reference frequency (for 3600 rpm in the above-mentioned condition of the 3600-rpm mode), thus, a reference clock signal of the 1/8 frequency, for 450 rpm in the above-mentioned condition of the 3600-rpm mode, is obtained, and the thus-obtained reference clock signal of the 1/8 frequency is provided to the spindle-motor driver 11 (in a step S2-3). In accordance with the thus-provided reference clock signal of the 1/8 frequency, when the 3600-rpm mode is set in the spindle-motor driver 11, the spindle-motor driver 11 causes the spindle motor 16 to rotate at 450 rpm.

Then, when the count value of the counter reaches 'N2' (where N2<N1) (in a step S2-4), 1/4 frequency dividing is performed on the reference clock signal of the reference frequency (for 3600 rpm in the above-mentioned condition of the 3600-rpm mode), thus, the reference clock signal of the 1/4 frequency, for 900 rpm in the above-mentioned condition of the 3600-rpm mode, is obtained, and the thus-obtained reference clock signal of the 1/4 frequency is provided to the spindle-motor driver 11 (in a step S2-5). In accordance with the thus-provided reference clock signal of the 1/4 frequency, when the 3600-rpm mode is set in the spindle-motor driver 11, the spindle-motor driver 11 causes the spindle motor 16 to rotate at 900 rpm.

Then, when the count value of the counter reaches 'N3' (where N3<N2) (in a step S2-6), 1/2 frequency dividing is performed on the reference clock signal of the reference frequency (for 3600 rpm in the above-mentioned condition of the 3600-rpm mode), thus, the reference clock signal of the 1/2 frequency, for 1800 rpm in the above-mentioned condition of the 3600-rpm mode, is obtained, and the thus-obtained reference clock signal of the 1/2 frequency is provided to the spindle-motor driver 11 (in a step S2-7). In accordance with the thus-provided reference clock signal of the 1/2 frequency, when the 3600-rpm mode is set in the spindle-motor driver 11, the spindle-motor driver 11 causes the spindle motor 16 to rotate at 1800 rpm.

Then, when the count value of the counter reaches 'N4' (where N4<N3, and, also, N4 is the above-mentioned initial value of the counter) (in a step S2-8), the reference clock signal of the reference frequency (for 3600 rpm in the above-mentioned condition of the 3600-rpm mode) is provided to the spindle-motor driver 11, as it is (in a step S2-9). In accordance with the thus-provided reference clock signal of the reference frequency, when the 3600-rpm mode is set in the spindle-motor driver 11, the spindle-motor driver 11 causes the spindle motor 16 to rotate at 3600 rpm.

Thus, in accordance with the number of the counted index pulses, that is, the number of revolutions of the spindle motor 16, the frequency of the reference clock signal provided to the spindle motor driver 11 is increased gradually to the reference frequency.

Thus, when information recording or reproducing is performed on the low-capacity floppy disk (HD, DD), the spindle motor 16 is rotated at 300 or 360 rpm so that the driving pin 16c of the chucking stand 16b of the spindle motor 16 engages with the positioning hole 15e of the hub 15b of the recording medium 15a. Then, the spindle motor 16 continues to rotate at 300 or 360 rpm. When information recording or reproducing is performed on the high-capacity floppy disk, after the spindle motor 16 is rotated at 300 or 360 rpm so that the driving pin 16c of the chucking stand 16b of the spindle motor 16 engages with the positioning hole 15e of the hub 15b of the recording medium 15a, the rotation speed of the spindle motor 16 is gradually increased to 3600 rpm by through-up control. Thereby, it is prevented that the driving pin 16c of the chucking stand 16b of the spindle motor 16 suddenly collides with the positioning hole 15e of the hub 15b of the recording medium 15a at high speed. As a result, the driving pin 16c and the positioning hole 15e are prevented from being damaged, and, also, the driving pin 16c positively engages with the positioning hole 15e.

In the above-described operations, when it is detected through the microswitches 22 that the conventional low-capacity floppy-disk cartridge DD is loaded in the disk device 1, the spindle motor 16 is immediately accelerated to rotate at 300 rpm. When it is detected through the microswitches 22 that the conventional low-capacity floppy-disk cartridge HD is loaded in the disk device 1, the spindle motor 16 is immediately accelerated to rotate at 300 rpm or 360 rpm.

Figure 7:
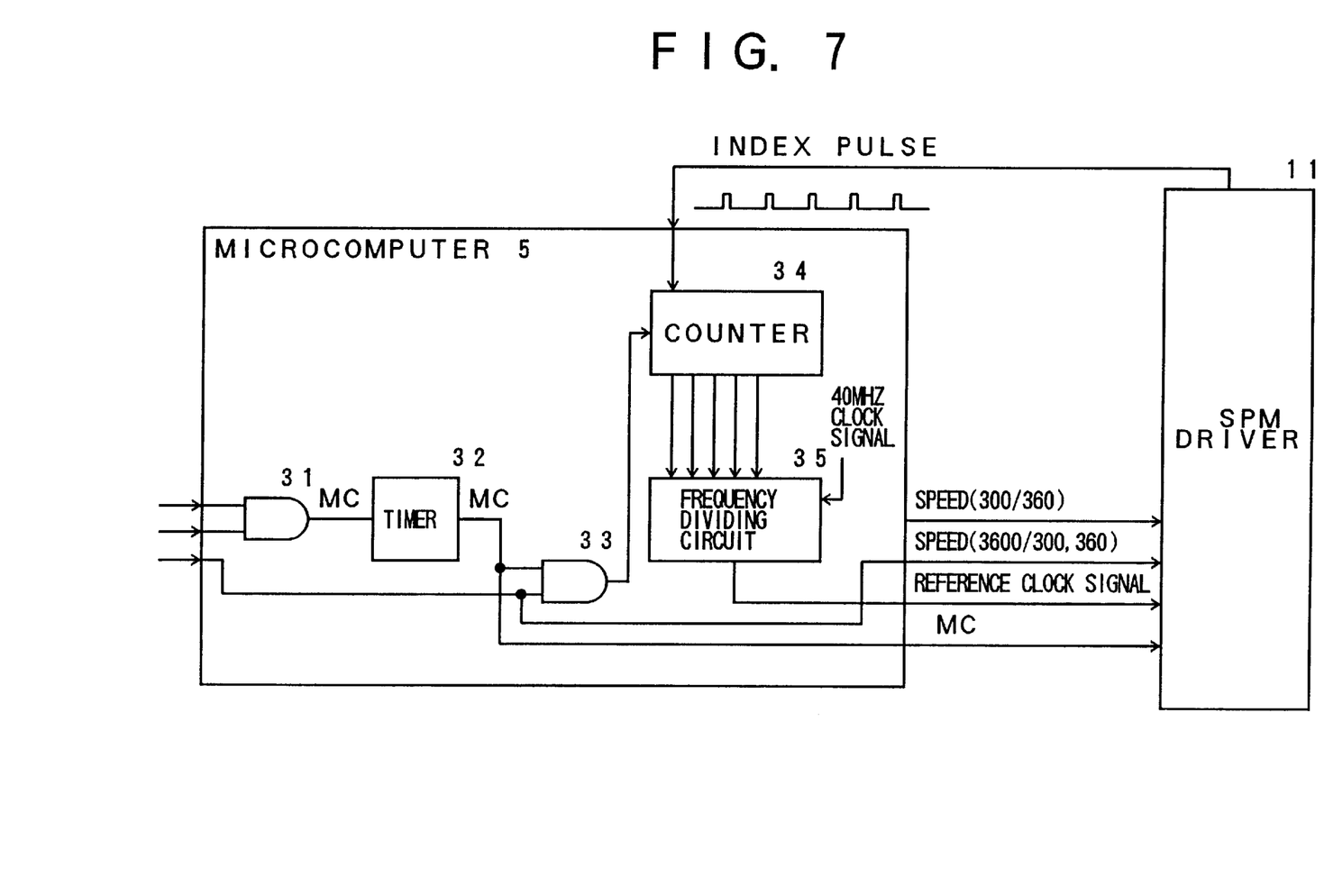
FIG. 7 illustrates operations of the microcomputer shown in FIG. 4 in a variant embodiment of the above-mentioned embodiment.

FIG. 7 illustrates operations of the microcomputer 5 in a variant embodiment of the above-described embodiment.

When the low-capacity floppy-disk cartridge is loaded in the disk device 1, the output of the disk-in sensor 20 is HIGH. At this time, when the motor driving signal indicates that the spindle motor 16 is to run, the output logic of an AND gate 31 is HIGH. The output logic of the AND gate 31 is provided to one input terminal of an AND gate 33 after being delayed a predetermined time by a monitoring timer 32.

When the low-capacity floppy-disk cartridge is loaded in the disk device 1, the signal from a predetermined switch of the microswitches 22, which is used for detecting whether or not the currently loaded recording medium 15a is the high-capacity floppy-disk, is LOW. This signal is provided to the other input terminal of the AND gate 33. Thereby, the output logic of the AND gate 33 is LOW. Thereby, a counter 34 is reset so as to have an initial value. This value is provided to a frequency dividing circuit 35 as the count value of the counter 34. Thereby, the frequency dividing circuit 35 outputs the reference clock signal of the reference frequency. When it is detected through the microswitches 22 that the low-capacity floppy-disk cartridge DD is loaded in the disk device, the spindle-motor driver 11 is set to a 300-rpm mode. When the 300-rpm mode is set in the spindle-motor driver 11 and the reference clock signal of the reference frequency is provided by the frequency dividing circuit 35, the spindle-motor driver 11 causes the spindle motor 16 to rotate at 300 rpm. When it is detected through the microswitches 22 that the low-capacity floppy-disk cartridge HD is loaded in the disk device, the spindle-motor driver 11 is set to a 300-rpm mode or a 360-rpm mode. When the 300-rpm mode or the 360-rpm mode is set in the spindle-motor driver 11 and the reference clock signal of the reference frequency is provided by the frequency dividing circuit 35, the spindle-motor driver 11 causes the spindle motor 16 to rotate at 300 rpm or 360 rpm.

When the high-capacity floppy-disk cartridge is loaded in the disk device 1, the output of the disk-in sensor is HIGH. At this time, when the motor driving signal indicates that the spindle motor 16 is to run, the output logic of the AND gate 31 is HIGH. The output logic of the AND gate 31 is provided to the one input terminal of the AND gate 33 after being delayed a predetermined time by the monitoring timer 32.

When the high-capacity floppy disk cartridge is loaded in the disk device 1, the signal from the above-mentioned predetermined switch of the microswitches 22, which is used for detecting whether or not the currently loaded recording medium 15a is the high-capacity floppy-disk, is HIGH. This signal is provided to the other input terminal of the AND gate 33. Thereby, the output logic of the AND gate 33 is HIGH. Then, a predetermined set value is set in the counter 34. When the high-capacity floppy-disk cartridge is loaded in the disk device 1, the spindle-motor driver 11 is set to a 3600-rpm mode. However, the predetermined set value is set in the counter 34, and this value is provided to the frequency dividing circuit 35 as the count value of the counter 34. The frequency dividing circuit 35 performs frequency dividing on the reference clock signal of the reference frequency in accordance with the frequency dividing ratio corresponding to the thus-provided count value of the counter 34.

The counter 34 down-counts the index pulses, that is, the count value of the counter 34 is decremented by one, from the predetermined set value, each time when the index pulse is input to the counter 34 from the PG 18. The frequency dividing circuit 35 performs frequency dividing on the reference clock signal of the reference frequency in accordance with the frequency dividing ratio corresponding to the count value of the counter 34, as mentioned above. Because the frequency dividing ratio of the frequency dividing circuit 35 decreases as the provided count value decreases as a result of the down-counting of the index pulses being performed by the counter 34, the frequency of the reference clock signal obtained from the frequency dividing and provided to the spindle-motor driver 11 gradually increases. Then, finally, the count value of the counter 34 reaches the above-mentioned initial value. As a result, the frequency dividing ratio of the frequency dividing circuit 35 becomes one, and, thereby, the reference clock signal of the reference frequency is provided to the spindle-motor driver 11 which then causes the spindle motor 16 to rotate at 3600 rpm, when the spindle-motor driver 11 is set to the 3600-rpm mode.

The above-described operations of the microcomputer 5 in the variant embodiment can be achieved through a logic circuit shown in FIG. 7. Therefore, it is possible that these operations are performed by the logic circuit instead of the microcomputer 5.

Control of the spindle motor 16 when the floppy-disk cartridge 15 is ejected from the disk device 1 will now be described.

When the high-capacity floppy-disk cartridge 15 is ejected from the disk device 1, braking of the spindle motor 16 is performed such that the rotation of the spindle motor 16 is stopped or the rotation speed of the spindle motor 16 is reduced. The braking of the spindle motor 16 is performed when the unsatisfactory pressing detecting unit 25 detects unsatisfactory pressing of the ejecting button 24 of the ejecting mechanism 23.

As a result of the braking of the spindle motor 16 being performed in the stage of the unsatisfactory pressing of the ejecting button 24, the driving pin 16c of the spindle motor 16 and the positioning hole 15e of the hub 15b of the recording medium 15a can be prevented from being damaged when the hub 15b of the recording medium 15a is chucked onto the chucking stand 16b again immediately after removal as a result of the ejecting button 24 being returned. After the floppy-disk cartridge 15 is completely ejected from the disk device 1, the microcomputer 1 performs control such that braking of the spindle motor 16 is performed and the spindle motor 16 is completely stopped.

When the ejecting button 24 is unsatisfactorily pressed so that the hub 15b of the recording medium 15a of the high-capacity floppy disk is removed from the chucking stand 16b of the spindle motor 16 through a first stage of the cartridge ejecting operation of the ejecting mechanism 23, and, then, the rejecting button 24 is returned, the steps S1-1 through S1-11 shown in FIG. 5 are performed. Thus, the spindle motor 16 is rotated so that the hub 15b of the recording medium 15a is positively chucked onto the chucking stand 16b of the spindle motor 16 again, and the spindle motor 16 is gradually accelerated, and, then, enters the steady-rotation condition, together with the recording medium 15a again.

At this time, the above-mentioned braking of the spindle motor 16 does not necessarily cause the spindle motor 16 to stop completely. The braking of the spindle motor 16 may be such that the rotation speed of the spindle motor 16 is reduced to the rotation speed (around 300 rpm) corresponding to the rotation speed for the low-capacity floppy disk, and rotation of the spindle motor 16 at around 300 rpm may be maintained.

Further, the present invention is not limited to the above-described embodiments, and variations and modifications may be made without departing from the scope of the present invention.

The contents of the basic Japanese Patent Application No. 9-319657, filed on Nov. 20, 1997, are hereby incorporated by reference.

What is claimed is:

1. A disk device, which performs information recording and reproducing on a recording medium of a disk cartridge loaded therein, comprising:

a motor rotating the recording medium of the disk cartridge loaded in said disk device;

a disk-type detecting unit detecting whether the recording medium of the disk cartridge loaded in said disk device is a high-capacity recording medium or a low-capacity recording medium;

a motor driving controlling unit causing said motor to rotate in accordance with a given reference clock signal, said motor driving controlling unit being set to a first mode for rotating said motor at a first rotation speed, at which information recording and reproducing is performed on the low-capacity recording medium, when said disk-type detecting unit detects that the recording medium of the loaded disk cartridge is the low-capacity recording medium, and being set to a second mode for rotating said motor at a second rotation speed, at which information recording and reproducing is performed on the high-capacity recording medium, when said disk-type detecting unit detects that the recording medium of the loaded disk cartridge is the high-capacity recording medium, said second rotation speed being higher than said first rotation speed; and a reference-clock-signal controlling unit for increasing in a controlled stepwise manner the frequency of the reference clock signal supplied to said motor driving control unit when said disk-type detecting unit detects that the recording medium of the loaded disk cartridge is the high-capacity recording medium, so that the rotation speed of said motor increases in a corresponding stepwise manner from said first rotation speed to said second rotation speed.

2. The disk device as claimed in claim 1, wherein said reference-clock-signal controlling unit counts index pulses obtained in response to rotation of said motor so as to obtain a resulting count value, and increases the frequency of the reference clock signal to be provided to said motor driving controlling unit in accordance with the obtained count value.

3. The disk device as claimed in claim 2, wherein said reference-clock-signal controlling unit, when said disk-type detecting unit detects that the recording medium of the loaded disk cartridge is the low-capacity recording medium, provides the reference clock signal of a frequency to said motor driving controlling unit such that said motor rotates at said first rotation speed.

4. The disk device as claimed in claim 1, further comprising a cartridge loading detecting unit detecting loading of the disk cartridge in said disk device, wherein, when said cartridge loading detecting unit detects that the disk cartridge is loaded in said disk device, a given motor driving signal indicates that said motor is to run, and said disk-type detecting unit detects that the recording medium of the loaded disk cartridge is the high-capacity recording medium, said reference-clock-signal controlling unit increases in a controlled stepwise manner the frequency of the reference clock signal to be provided to said motor driving controlling unit so that the rotation speed of said motor gradually increases in a corresponding stepwise manner from said first rotation speed to said second rotation speed.

5. The disk device as claimed in claim 4, wherein said reference-clock-signal controlling unit, when said disk-type detecting unit detects that the recording medium of the loaded disk cartridge is the high-capacity recording medium, causes starting of the increase of the frequency of the reference clock signal to be delayed a predetermined time from the time when said cartridge loading detecting unit detects that the disk cartridge is loaded in said disk device and the given motor driving signal indicates that said motor is to run.

* * * * *